United States Patent
Robertson et al.

(10) Patent No.: US 6,851,094 B1
(45) Date of Patent: Feb. 1, 2005

(54) AUTOMATED METHOD AND SYSTEM FOR SELECTING AND PROCURING ELECTRONIC COMPONENTS USED IN CIRCUIT AND CHIP DESIGNS

(75) Inventors: William H. Robertson, Los Altos, CA (US); James M. Plymale, Beaverton, OR (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/514,674

(22) Filed: Feb. 28, 2000

(51) Int. Cl.[7] .............................................. G06F 17/50
(52) U.S. Cl. ......................................... 716/1; 709/217
(58) Field of Search .............................................. 716/1

(56) References Cited

U.S. PATENT DOCUMENTS

| | | | |
|---|---|---|---|
| 5,761,093 A | * 6/1998 | Urbish et al. ............... | 700/107 |
| 5,862,223 A | * 1/1999 | Walker et al. ................. | 705/1 |
| 5,878,408 A | 3/1999 | McDonald et al. | |
| 5,933,356 A | 8/1999 | Rostoker et al. | |
| 6,058,426 A | 5/2000 | Godwin et al. | |
| 6,102,961 A | * 8/2000 | Lee et al. ....................... | 716/1 |
| 6,141,724 A | 10/2000 | Butler et al. | |
| 6,269,467 B1 | * 7/2001 | Chang et al. .................. | 716/1 |
| 6,336,209 B1 | * 1/2002 | Nishihara et al. ............. | 716/17 |

FOREIGN PATENT DOCUMENTS

| | | |
|---|---|---|
| EP | 0433066 | 6/1991 |
| EP | 0944002 | 9/1999 |
| EP | 1063599 | 12/2000 |
| WO | WO01/65422 | 9/2001 |

OTHER PUBLICATIONS

Diekman, D. et al., "DISCOE: distributed design and analysis to preserve intellectual property", Sep. 1998, IEEE, pp. 57–60.*

Dalpasso, M. et al., "Specification and validation of distributed IP–based design with JavaCAD", Mar. 1999, IEEE, pp. 684–688.*

(List continued on next page.)

Primary Examiner—Stacy A. Whitmore
(74) Attorney, Agent, or Firm—Bingham McCutchen LLP (57) ABSTRACT

A method and system for obtaining information about electronic components, managing that information, and/or purchasing and procuring electronic components comprises a remote parts database connected to a distributed electronic network, such as the Internet. The remote parts database stores a plurality of dynamic parts for use in a schematic program run on a user workstation. When the user connects to the remote parts database, a listing of available dynamic parts are displayed on the user's workstation. The user selects dynamic parts for inclusion into an application (such as a schematic program) running on the user's workstation. The dynamic parts are downloaded to the user workstation and a local database. The downloaded information includes data regarding the parts functionality plus component data items such as supplier or distributor information, timing information, application notes, and a link (e.g., URL) to either the remote parts database or a remote supplier or manufacturer database. As dynamic parts are selected for use in a design, their information may be forwarded to a parts approval process for qualification with the designer's organization. From a design in the schematic program having multiple dynamic parts, a bill of materials may be automatically generated based on the locally stored component data items, including the supplier/distributor information.

27 Claims, 6 Drawing Sheets

OTHER PUBLICATIONS

Dong–Eun Lee et al., "CADIC: computer–aided design on internet with cryptosystem", Oct. 1998, IEEE, pp. 2670–2674.*

Zorian, Y, "Test requirements for embedded core–based systems and IEEE P1500", Nov. 1997, IEEE, pp. 191–197.*

Larson, N, et al., "Managing desing processes: a risk assessment approach", Nov. 1996, IEEE, pp. 749–759.*

Benini, L. et al., "Distributed EDA tool integration: the PPP paradigm," Proceedings of the International Conference on Computer Design, Oct. 1998, IEEE, pp. 448–453.

Blanchard, D., "EDA on the WWW PCB CAD," Printed Circuit Design Miller Freeman, Feb. 1998, vol. 15, No. 2, pp. 34–37.

Chan et al., "WELD—An Environmental for Web–Based Electronic Design," Proceedings of the 35$^{th}$ Design Automation Conference, May 1998, pp. 146–151.

Geppert, L., "The Rising Tide of Web–Based Tools and Services Augura the Next Sea Change in Electronic Design IC Design on the World Wide Web," IEEE Spectrum, Jun. 1998, vol. 35, No. 6, pp. 45–50.

Moranti, "Got IP," Printed Circuit Design, Miller Freeman, Oct. 1998, vol. 10, No. 10, pp. 31–33.

Perrin B., "Web–Based Circuit Engineering," Circuit Cellar Ink, Mar. 1999, No. 104, pp. 28–30, 33, 35, 37–38.

Schindler, P. et al., "IP repository, a Web based IP reuse infrastructure," Custom–Integrated Circuits, May 1999, IEEE, pp. 415–418.

Kondurf et al., "A Framework for Collaborative and Distributed Web–Based Design," Proceedings of the 36$^{th}$ Design Automation Conference, Jun. 1999, pp. 898–903.

Wilsey, P., "Web–Based Analysis and Distrubuted IP," Proceedings of the 1999 Winter Simulation Conference, pp. 1445–1453.

Rao et al., "Web–Based Network Analysis and Design," ACM Transactions on Modeling and Computer Simulation, Jan. 2000, vol. 10, Issue 1, pp. 18–38.

Wen et al., "Concurrent–Simulation–Based Remote IP Evaluation over the Internet for System–On–Chip Design," 14$^{th}$ International Symposium on System Synthesis, Sep. 2001, pp. 233–238.

Brglz, F. et al., "A universal client for distributed networked design and computing," Jun. 2001, IEEE, pp. 401–406.

Delpasso, M. et al., "Virtual simulation of distributed IP–based designs," Jun. 1999, IEEE, pp. 50–55.

Orfali, Robert et. Al., The essential client/server survival guide, 1996, Katherine Showalter, 2$^{nd}$ ed., pp. 228–233, and 476.

* cited by examiner

AUTOMATED METHOD AND SYSTEM FOR SELECTING AND PROCURING ELECTRONIC COMPONENTS USED IN CIRCUIT AND CHIP DESIGNS

BACKGROUND OF THE INVENTION

1) Field of the Invention

The field of invention relates to electronic design automation and, more specifically, to automated methods and systems for selecting and procuring electronic components used in circuit and chip designs.

2) Background

The electronics industry produces ever more advanced circuit designs with the assistance of continuously improving integrated circuits, design tools and verification tools. Chip designs may contain tens or hundreds of thousands of gates per chip, and will shortly be in the range of millions of gates per chip.

Electronic systems have traditionally been built using combinations of stand-alone, individually packaged chips, which are assembled on printed circuit boards (PCBs) and connected together to obtain the desired functionality.

Market demands continue to push designers to develop printed circuit board designs more rapidly and efficiently. A recent trend to increase design speed and efficiency involves the re-use or recycling of electronic circuit blocks or subsystems, which are alternatively referred to as "virtual component blocks" or "IPs" (an acronym for "Intellectual Properties," which denotes the proprietary nature of these pre-packaged circuit blocks).

Once the design for a virtual component block has been tested and verified, it can be re-used in other applications which may be completely distinct from the application which led to its original creation. For example, a subsystem for a cellular phone ASIC may contain a micro-controller as well as a digital signal processor and other components. After the design for the cellular phone subsystem has been tested and verified, it could be re-used (as a virtual component block) in, for example, an automotive application. Design reuse of virtual component blocks allows a designer to complete a design much faster than building the entire design from scratch, and avoids the need for debugging, testing and verification of the subsystems embodied in the virtual component block.

Despite the relatively advanced techniques for creating printed circuit board designs, the methods for procuring and purchasing electronic components for completed designs have remained relatively archaic. At the same time, increased competition has resulted in growing pressures to reduce time-to-market with new products, because the first company to come out with a new type of product typically has an advantage over its competitors. Even short delays in reaching market can have a significant impact in term of product success.

Presently used methods of searching for and managing component information are cumbersome, inefficient and problematic. A significant amount of valuable engineering time is lost in searching for data on electronic components. Indeed, it has been estimated that at least thirty percent, and perhaps as much as eighty-five percent, of an engineer's time is spent not designing, but rather searching for, analyzing, and following up on electronic components.

Engineers traditionally have searched for parts by perusing data sheets and component catalogs, and by placing phone calls to suppliers or distributors to obtain component information, catalogs or brochures. Catalogs are bulky, take up space, and can be inefficient to peruse. Further, catalogs by their nature are static, not dynamic; thus, changes or additions to a supplier or distributor's products are not immediately reflected in the catalog, but are generally conveyed to a designer by mail. Not only does this notification process take time, but mail service is not entirely reliable, and such changes or additions may never reach the designer. If they do reach the designer, they can easily be misplaced, misfiled or lost. Further, component price data typically changes frequently, and such price changes must typically be communicated by mail, like any other update. Oral information communicated from a supplier to an engineer by telephone is inherently unreliable as well. The engineer may not understand the information, or may write it down incorrectly, further, there is no assurance that the person supplying that information is properly trained or has the correct data on hand to communicate.

In order to make the availability of component information more convenient, a number of electronic parts manufacturers, suppliers and distributors currently make component information available through the Internet, generally by placing such information on their website. However, searching the Internet for individual parts can be time-consuming and tedious. Further, current search engines and methodologies are inefficient and do not cover the entire web space, and may thus return search results that do not include one or more websites that may offer parts that a designer could beneficially use in a design. In addition, parts data on supplier's and distributor's websites is often presented on-screen in the same fashion as an engineer would see it in a catalog or other printed material, thereby conferring no content advantage over printed catalogs.

After a designer has managed to collect component data from these various disparate sources, the information must be managed in such a manner that allows for selection of specific components. When this component data is gathered from a multitude of sources, it can be difficult to organize it in a useful way. Further, it is time-consuming and inefficient to manually create a matrix or other analytical aid comparing multiple parts in order to facilitate selection.

The component management problem does not end with parts selection. After the engineer has chosen an electronic component, it then must be referenced in the circuit design schematic. Although there are many programs commercially available for schematic generation and capture, such programs typically rely on the manual input of symbol and footprint data. For example, if an engineer chooses an operational amplifier as a component in a larger design, he or she must manually create a symbol for an operational amplifier in the schematic program. Generally schematic programs are graphically-oriented. Thus, the engineer may select an operational amplifier symbol within the schematic program and move it into a circuit modeled within the schematic program. However, information associated with each symbol is typically generic. Such information is usually limited to identification of the type of part represented by the symbol, and does not contain specific data regarding the specific part selected by the engineer, as the schematic program has no way of knowing which specific part will be used. Specific component information is usually input into the schematic program manually, which is a time-consuming and tedious task.

Pricing and procurement are additional aspects of component management that are currently inefficient and time-consuming for designers. The parts used in a circuit design are typically listed in a bill of materials (BOM) prior to manufacturing the design. The BOM generally contains information regarding the specific parts to be used, and their quantities. Before purchasing parts, the BOM is typically placed through an authorization process, where a decision is made whether use of the parts on the BOM is economical. Many companies have preferred suppliers or preferred distributors from which discounts are obtained, so one or more components that the designer has selected during the design process may not be preferred components for the company. To save on component costs, the designer is often required to change the design to utilize the preferred components. Such changes can easily result in additional design time and rework. If the designer is allowed to use a new part, it must first be approved, but the approval process can be cumbersome, bureaucratic and lengthy, adding to the overall time to market.

Other aspects of managing electronic component data include documentation and configuration control of the components used in the design. When there are several design iterations, part changes, or other alterations, as inevitably happens during a long and complex design process, documentation of the details of each such change is often not a high priority of the engineering team, especially where other pressures relating to completion of the design absorb the focus of the engineering team. Further, time spent by engineers on configuration control is essentially wasted from the standpoint of producing a working design. Thus, documentation and configuration control lead to inefficiencies in the design process, and in any event are viewed by many engineers as tedious, time-consuming tasks.

Another problem with managing information relating to electronic components is inaccuracy of parts data brought into the design schematic. As discussed above, a circuit designer typically combs through a multitude of sources for information regarding electronic components, such as data sheets, parts catalogs, supplier websites, and trade show brochures, and also may make telephone calls to suppliers to obtain parts information. However, most of this information is not available in a form of maximum usefulness to the circuit designer. After the designer selects a part, specific data regarding that part must be transcribed into a form usable by the engineer's schematic design tools, which, as previously noted, involves substantial manual input of data. Manual entry of this data is inefficient and lends itself to typographical errors on entry, particularly among engineering designers who may not possess sophisticated typing or data entry skills. Further, the prospect of errors is even more substantial when the parts data is not obtained from reliable sources such as data sheets and parts catalogs, but rather from less reliable sources, such as hurried notes scribbled during a telephone call with a supplier or an e-mail message from another designer. Errors caused by clerical mistakes or other human error do not remain isolated, but generally create a ripple effect in the design as a whole.

The entry of inaccurate part data may lead to redesign and rework of the original design. The entry of incorrect data for a specific component may affect not only other components directly connected with it, but also other components both upstream and downstream from it. For example, other designers working on other parts of the design may rely on that incorrect data, resulting in the inadvertent introduction of errors into other portions of the design. Design changes, even small ones, may also result in significant, unexpected downstream effects if they are not properly entered and documented.

Another source of errors relating to component information management is incorrect part identification. Typically, parts used in a circuit design are identified and controlled by a unique part identifier. If the part identifier is incorrectly entered in the schematic, or the part has been changed by a designer without changing the identifier in the schematic, the wrong part will be purchased. If such an error is not caught in time, then the procurement process must begin again with the proper part after the incorrect part has been delivered, adding what may be an unacceptable amount of delay to projects with a very tight time to market. Similarly, it is possible that the designer may enter the correct part number for a component, and yet not enter the correct footprint data. Incorrect footprint data can lead to incorrect pin numbers, incorrect pin spacing, the wrong package size, and the wrong package technology (e.g. surface mount vs. through-hole packaging). Erroneous footprint data can force a complete redesign of the printed circuit board if inadequate room is left on the printed circuit board for a key component. It is possible for these errors to appear cumulatively, adding to the burden of creating a working product. Such errors require time to resolve and can significantly increase the time to market of the overall design. The time and expense to redesign is multiplied when rework is required—that is, when a prototype or actual product under construction must be physically rebuilt due to design changes.

Another problem with the current component procurement and management process is the unnecessary introduction of new, redundant components into a company's materials handling system. Many companies have software for material resource planning (MRP). Most MRP systems are designed for manufacturing and purchasing functions, but not for engineering design. These MRP systems typically contain a great number of parts identified by part number, and are utilized with the intent of speeding up approval, purchasing and procurement of parts. However, because MRP systems generally do not include the type of detailed specification data that an engineer requires to perform design, engineers are not readily able to search the data in MRP systems to find appropriate parts. For example, the designer may require a resistor having a resistance of 50 ohms. Current MRP systems generally would not allow the engineer to search for and find such a part, based on engineering-based criteria like resistance. Thus, the designer does not have easy visibility into all of the standard parts currently utilized by a company. As a result, the designer may introduce a new part, rather than reuse existing parts. This is wasteful from a business standpoint, because studies have shown that a significant percentage (e.g., from 20% to 40) of a company's inventory may be duplicate parts. When new parts are selected and chosen by an engineering design team, but existing parts in inventory would perform the job just as well, additional inventory is created, additional cost is incurred, and inefficiency results. Studies have shown that it can be very costly (e.g., up to $30,000) to introduce a new part into an inventory system, and to maintain a part in an inventory system can be quite costly as well (e.g., on the order of $10,000 per year). Further, approval and qualification of new parts and new suppliers is time-consuming and tedious. Thus, the failure for an engineer to use pre-approved parts in the company's MRP system results in significant cost increases in manufacturing, and thus higher product cost to the consumer.

Another problem related to component procurement is prototype delay due to out-of-stock parts. When selecting components for electronic design, engineers typically consider lead time as a factor. If the time to market goal is short, and several components are comparable, the one that can be supplied in the shortest time is typically chosen. Short lead times pose minimal threats to overall time-to-market schedules, and are safer engineering choices. However, lead times for components can change significantly with time. That is, the lead time quoted to an engineer at the beginning of a design project may be substantially different months later, when the part is to be purchased. This may occur for a variety of reasons, including, for example, an increase in demand for the component, a shortage of raw material utilized to fabricate the component, or a disaster such as earthquake or fire striking the facility of a component's manufacturer. Thus, for example, a part with a quoted lead time of two weeks at the time of its selection could have a 30-week lead time at the time of manufacturing. It is also possible for designers, particularly inexperienced ones, simply to fail to consider the lead time of a given component when creating a design, thus potentially resulting in surprises during manufacturing when such components are not available. Changes in lead time often cause changes in the schematic, because new components and different components may have to be chosen to overcome lead time difficulties. Such schematic changes and design changes are inefficient, consume time, delay product introduction, and introduce additional problems as described above.

It would advantageous to improve access by designer's to useful component information from otherwise disparate sources. It would further be advantageous to provide component information in a form that is of maximum usefulness to the circuit designer. It would also be advantageous to provide component information that is reliable and up-to-date, and that changes or updates automatically when changes to a circuit design are made. It would further be advantageous to provide a method and system for efficiently procuring components used in circuit designs.

SUMMARY OF THE INVENTION

The invention provides, in various preferred embodiments, methods and systems for conveniently obtaining information about electronic components, managing that information, and/or purchasing and procuring electronic components.

In one embodiment as disclosed herein, a user manages component information via a schematic program linked to component data stored in one or more separate databases. Preferably, at least some of the component data is stored in a remote parts database accessible to the user's schematic program through a wide area distributed electronic network, such as the Internet. In such an embodiment, the schematic program preferably displays data pertaining to the electronic components (such as footprint, cost and availability) stored in the database. The component data may be stored in a standardized format so as to facilitate searching for and comparisons between components.

In another embodiment, disclosed herein, a remote parts database stores component information in the form of "dynamic parts" that are subject to occasional modification by the database owner. The user may obtain a dynamic part representing an electronic component from the remote parts database, and utilize the dynamic part in a design through a schematic program run on a computer. The dynamic part may, in one or more embodiments, be placed into a design by placing the dynamic part from an on-screen available parts listing into the design through the schematic program. The on-screen available parts listing may be based at least in part upon the remote parts database. In one or more embodiments, dynamic parts function within the schematic program as standard components of the overall design. In another aspect, when a dynamic part is inserted into the schematic, data regarding the component represented by the dynamic may be inserted into a local database linked to that dynamic part. Such data items may include, for example, the manufacturer and/or distributor of the component, and specification data regarding the component (such as component type and footprint, for example).

In another embodiment as disclosed herein, a dynamic part inserted into a design retains a link to one or more external databases, through which information regarding the component represented by the dynamic part may be obtained and/or updated as needed. Such updates may be of a type in which the schematic program, local database or user actively retrieves the data from the remote database to the schematic program or a local database, or of a type in which the external database transmits updated data to the schematic program or a local database without need for initiation or intervention by the user or schematic program.

In another embodiment, when a dynamic part is placed into the user's schematic program, the dynamic part is also automatically entered into the user's parts approval system.

In yet another embodiment, an electronic bill of materials containing a list of the dynamic parts utilized in the design and their quantities is automatically generated. The electronic bill of materials may be linked to a local and/or remote database in order to provide current component information regarding these parts (such as, for example, their approval status and backlog time).

Further embodiments, variations, modifications and enhancements also described herein and illustrated in the drawings.

BRIEF DESCRIPTION OF DRAWINGS

The invention may be better understood by reference to the drawings, wherein.

DETAILED DESCRIPTION OF THE PREFERRED EMBODIMENTS

In one or more embodiments as described herein, methods and systems for conveniently obtaining information about electronic components, managing that information, and/or purchasing and procuring electronic components are provided.

Chip designers often use electronic design automation (EDA) software tools to assist in the design process, and to allow simulation of a chip design prior to prototyping or production. Chip design using EDA software tools generally involves an iterative process whereby the chip design is gradually perfected. Typically, the chip designer builds up a circuit by inputting information at a computer workstation generally having high quality graphics capability so as to display portions of the circuit design as needed. A top-down design methodology is commonly employed using hardware description languages (HDLs), such as Verilog® or VHDL, for example, by which the designer creates an integrated circuit by hierarchically defining functional components of the circuit, and then decomposing each component into smaller and smaller components.

The various components of an integrated circuit are initially defined by their functional operations and relevant inputs and outputs. The designer may also provide basic organizational information about the placement of components in the circuit using floorplanning tools. During these design states, the designer generally structures the circuit using considerable hierarchical information, and has typically provided substantial regularity in the design.

From the HDL or other high level description, the actual logic cell implementation is typically determined by logic synthesis, which converts the functional description of the circuit into a specific circuit implementation. The logic cells are then "placed" (i.e., given specific coordinate locations in the circuit layout) and "routed" (i.e., wired or connected together according to the designer's circuit definitions). The placement and routing software routines generally accept as their input a flattened netlist that has been generated by the logic synthesis process. This flattened netlist identifies the specific logic cell instances from a target standard cell library, and describes the specific cell-to-cell connectivity.

Further explanation of a particular chip design process, with emphasis on placement and routing of datapaths, is set forth, for example, in U.S. Pat. No. 5,838,583, hereby incorporated by reference as if set forth fully herein.

Figure 1:
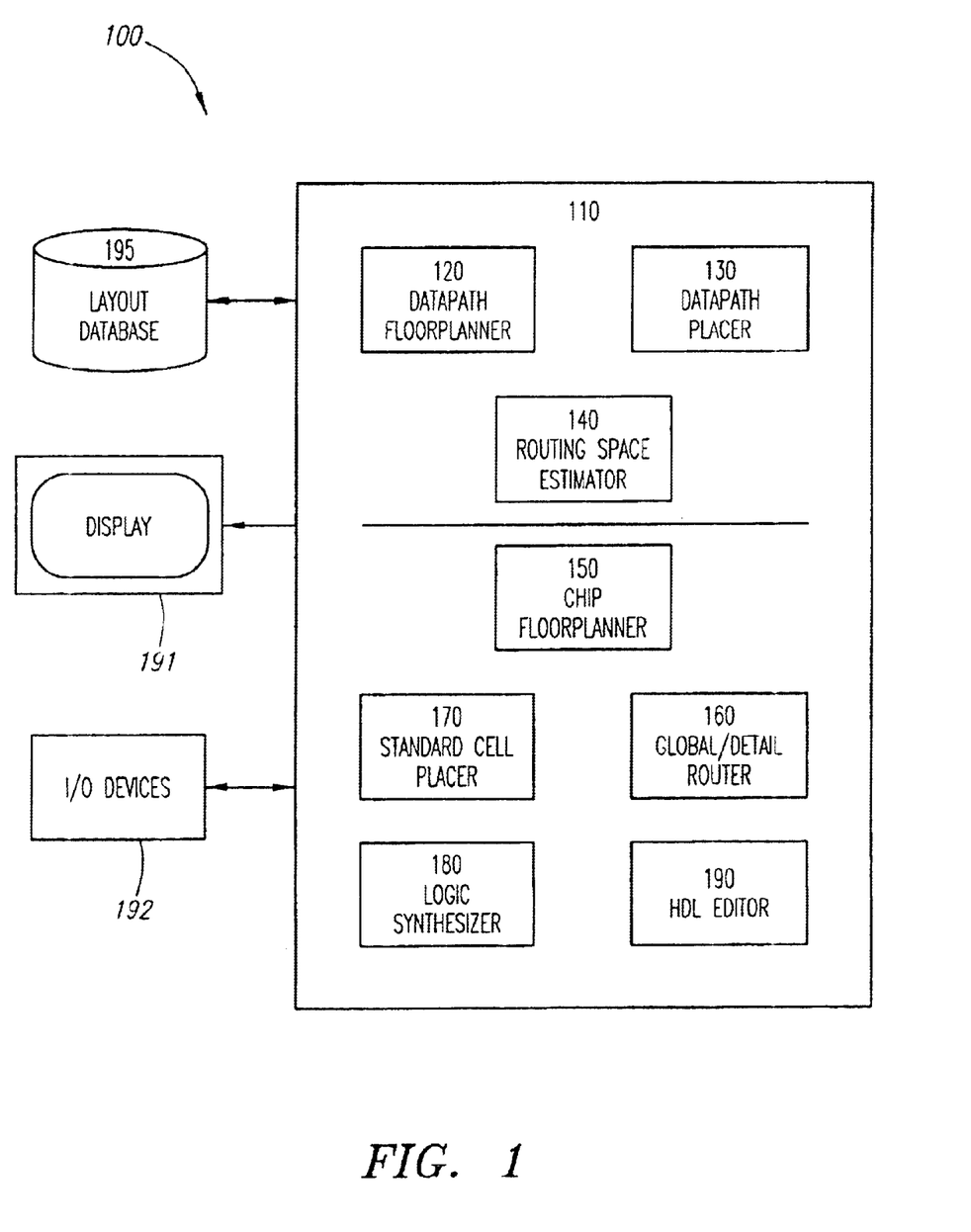
FIG. 1 is a diagram of a computer system that may be used in connection with various embodiments of the invention as described herein.

FIG. 1 is a diagram of a computer system that may be used in connection with various embodiments as described herein. As shown in FIG. 1, a computer system 100 includes a computer 110 connected to a display 191 and various input-output devices 192. The computer 110 may comprise one or more processors (not shown), as well as working memory (e.g., RAM) in an amount sufficient to satisfy the speed and processing requirements of the system. The computer 110 may comprise, for example, a SPARC™ workstation commercially available from Sun Computers, Inc. of Santa Clara, Calif., or any other suitable computer.

The computer 110 contains stored program code including, in one embodiment, a datapath floorplanner 120, a datapath placer 130 and a routing space estimator 140. The datapath floorplanner 120 provides for the definition of datapath functions, datapath regions, and constraints on these for the purpose of interactive floorplanning operations by the circuit designer, and the control of placement operations of the datapath placer 130. The datapath placer 130 determines the placement of datapath functions within datapath regions, and the placement of logic cell instances within each datapath function, according to the constraints defined by the circuit designer. The routing space estimator 140 estimates routing space required for routing the datapath functions, given the placement of such functions by the datapath placer 130.

In support of the above-mentioned system components, a chip floorplanner 150, global/detail router 160, standard cell placer 170, logic synthesizer 180, and HDL editor 190 may be usefully employed. Operation of the chip floorplanner 150, global/detail router 160, standard cell placer 170, logic synthesizer 180, and HDL editor 190 is conventional, as the design of these components is well known in the art of electronic design automation. Commercially available examples of these system components are Preview™, Cell3™, QPlace™, Synergy™, and Verilog®, respectively. The computer 110 may also be provided with various tools for assisting in a construction of a balanced H-Tree for clocking signal layout. Examples of such tools, or of their general functionality, are described hereinafter.

The computer 110 is preferably coupled to a mass storage device (e.g., magnetic disk or cartridge storage) providing a layout database 195 with which the foregoing system components interface. The layout database 195 may be implemented using the EDIF database standard. The computer 110 may also comprise or be connected to mass storage containing one or more component libraries (not shown) specifying features of electrical components available for use in circuit designs.

Figure 2:
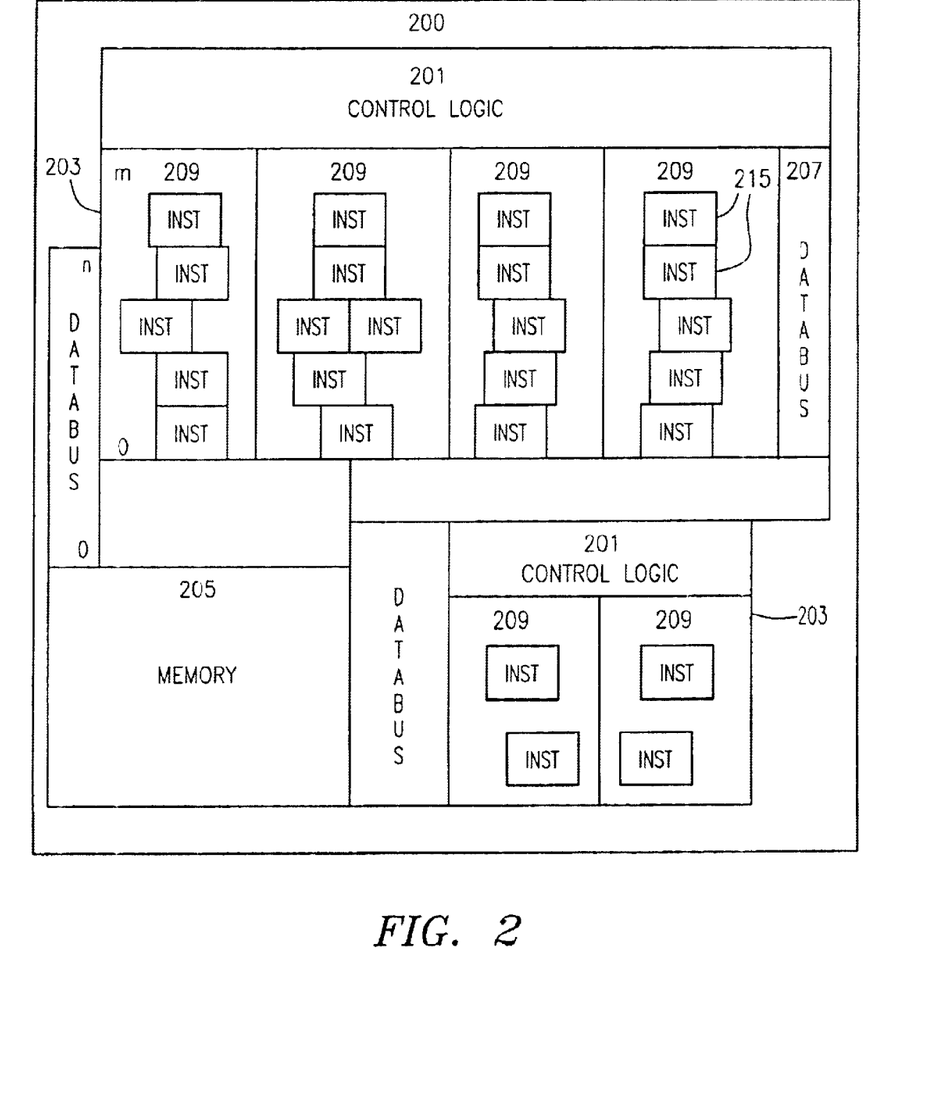
FIG. 2 is a diagram of a simplified integrated circuit design as may be represented in the form of a virtual component block.

Referring now to FIG. 2, there is shown a schematic illustration of a simplified integrated circuit 200 that may be represented by virtual circuit design data stored in the layout database 195. In actual, more realistic integrated circuit designs, the integrated circuit 200 would be far more complicated. However, FIG. 2 is useful for purposes of illustration. As shown therein, the integrated circuit 200 comprises of a plurality of control regions 201, datapath regions 203, and memory 205. The various control regions 201, datapath regions 203 and memory 205 are interconnected with databuses 207 generally spanning multiple bits. Each datapath region 203 may comprise a plurality of datapath functions 209. A datapath function 209 may utilize some or all of the bits available from the databus 207. A datapath function 209 may comprise a plurality of cell instances 215 which enable some form of signal or logic transformation of the data passed by the databus 207. The cell instance 215 within a datapath function 209 generally operates on the data carried on the datapath function 209.

As represented in the schema of the layout database 195, the integrated circuit 200 is comprised of a plurality of instances and a plurality of nets. A net interconnects a number of instances, by associating pins on each of the instances.

Figure 3:
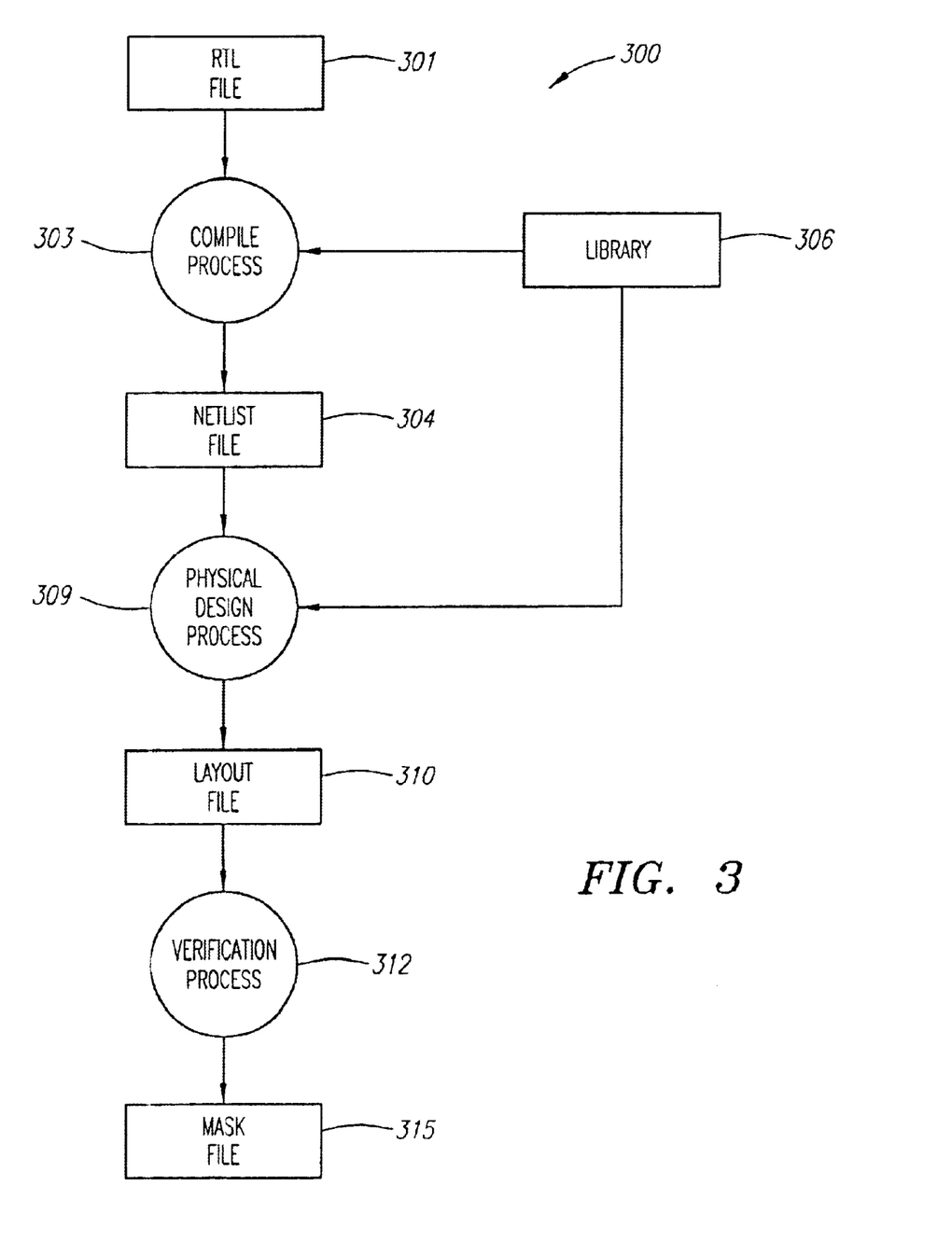
FIG. 3 is a diagram of a general process flow for a circuit design, illustrating various levels of circuit abstraction.

FIG. 3 is a diagram of a general process flow for a circuit design, illustrating some of the various levels of circuit abstraction as described above. As illustrated in FIG. 3, a register transfer logic (RTL) file 301 in the form of an HDL file or other high level functional description undergoes a compile process 303, which typically includes some form of logic synthesis, and converts the functional description of the circuit into a specific circuit implementation which may be stored in the form of a netlist file 304. As part of the compile process 303, a component library 306 is generally referenced, which stores information concerning what types of design components are available, and the characteristics of those design components which are needed in order to determine their functional connectivity. At this process stage, some attempt may be made at circuit optimization in order to minimize the number of components used in the circuit design. The netlist file 304, as previously noted, generally identifies the specific logic cell instances from a target standard cell library, and describes the specific cell-to-cell connectivity.

By application of a physical design process 309 shown in FIG. 3, the logic cells of the netlist file 304 are then placed and routed, resulting in a layout file 310. The physical design process 309 may include area minimization efforts. The component library 306 is utilized in this process stage in order to obtain information concerning the sizes of gates and other components that may be present in the netlist file 304.

From the layout file 310, a verification process 312 may be run, as further illustrated in FIG. 3, resulting in a mask file 315 in, for example, a GDSII or CIF format. The mask file 315 may be provided to a foundry, and contains enough information to allow the foundry to manufacture an actual integrated circuit therefrom.

Figure 4:
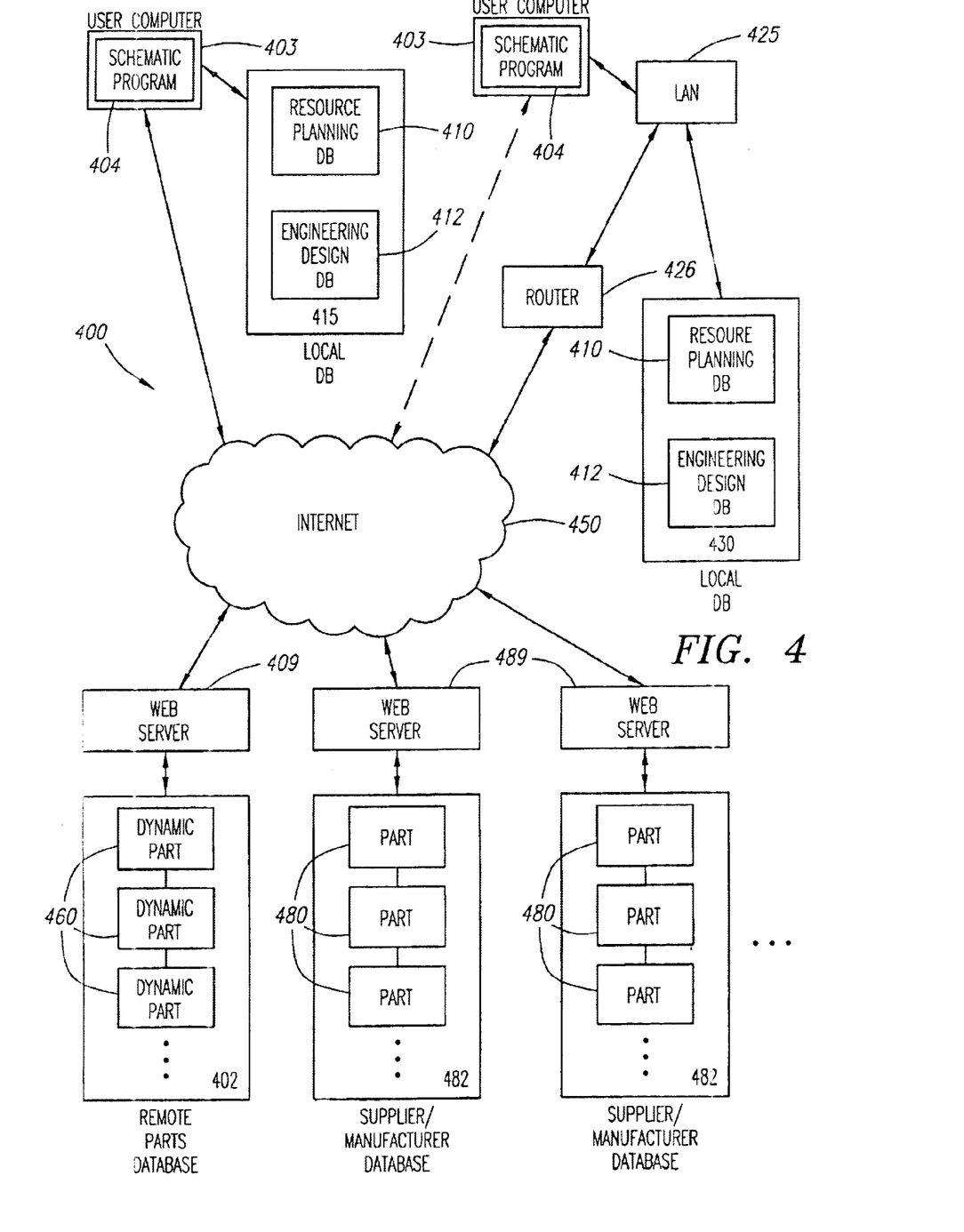
FIG. 4 is a schematic representation of a system for selecting and utilizing dynamic representations of electronic components.

Referring now to FIG. 4, a high-level overview of a preferred embodiment of a component selection and procurement system 400 for selecting and purchasing electronic components over a wide-area distributed electronic network, such as the Internet 450, as illustrated. As shown in FIG. 4, a user workstation 403 (e.g., computer 110 shown in FIG. 1) may be connected to the Internet 450 through either a standard client software for Internet access, or else through a local area network (LAN) 425 having a router 426 for achieving access to the Internet. While two user workstations 403 are depicted in FIG. 4 for purposes of illustration, any number of user workstations 403 may be utilized as part of the component selection and procurement system 400, subject to the limitations of the supporting hardware. The user workstation 403 may run a schematic program 404, such as, for example, a schematic design or schematic capture program, along with additional functionality provided by parts selection software tools and related tools as further described herein. The user workstation 403 is preferably connected, via the local area network 425 or otherwise, to a local database 415 comprising a resource planning database 410 and an engineering design database 412. The component selection and procurement system 400 additionally includes a remote parts database 402, which is connected to the Internet 450 through, for example, a web server 409. The remote parts database 402 is so called because it is preferably separated from a physical standpoint from the user workstation 403, and located at a site remote from the user's workstation and facilities. The remote parts database 402 is preferably a relational database, of the type, for example, commercially available from any of a number of providers (e.g., Oracle Corporation).

The remote parts database 402 is populated with an assortment of dynamic parts 460. In a preferred embodiment, each dynamic part 460 represents a specific electronic component. For example, a particular dynamic part 460 may represent a specific type of resistor. Other dynamic parts 460 may represent other types of resistors, or, for example, different types of electrical components such as field-programmable gate arrays (FPGAs), microprocessors, capacitors, diodes, or other electronic components. Each dynamic part 460 comprises a modeling behavior characteristics and component data. Each dynamic part 460 is constructed so as to provide the proper functionality within the schematic program 404, as an element of an electronic schematic or circuit design. For example, a dynamic part 460 representing a resistor would comprise a set of modeling behavior characteristics providing functionality of a resistor component within the schematic program 404, so long as the particular schematic program 404 is capable of modeling the behavior of the particular dynamic component 460. The dynamic part 460 may be optimized for use with a particular schematic program 404, such as Capture™, and different versions of a dynamic part 460 may be provided for use with different types or brands of schematic programs 404. Each dynamic part 460 is also, as noted above, associated with one or more component data items relating to the dynamic part 460. For example, such component data items may include the manufacturer, part number, availability, electronic properties, number of inputs, outputs, pins, or other properties which may be useful to a designer. Both the modeling behavior characteristics and the component data may be stored together in the remote parts database 402.

The component selection and procurement system 400 further includes one or more remote supplier/distributor databases 482, each of which allows access from user workstations 403 connecting over the Internet 450 through, for example, a web server 489. Each supplier/distributor database 482 stores one or more parts records 480 containing information pertaining to the dynamic parts 460 stored in the remote parts database 402. In alternative embodiments, the suppler/distributor databases 482 may be accessed through an application program at the remote parts database web server 409, which may establish direct electronic connections through any available communication medium to the remote supplier/distributor databases 482, such as through direct dial-up connections, dedicated electrical lines, cable or T-1 communication lines, fiber optic lines, wireless communication channels, or any other means for electrically connecting two endpoints. The following discussion, however, focuses on the preferred configuration in which the remote supplier/distributor databases 482 are accessible over the Internet 450.

Figure 5:
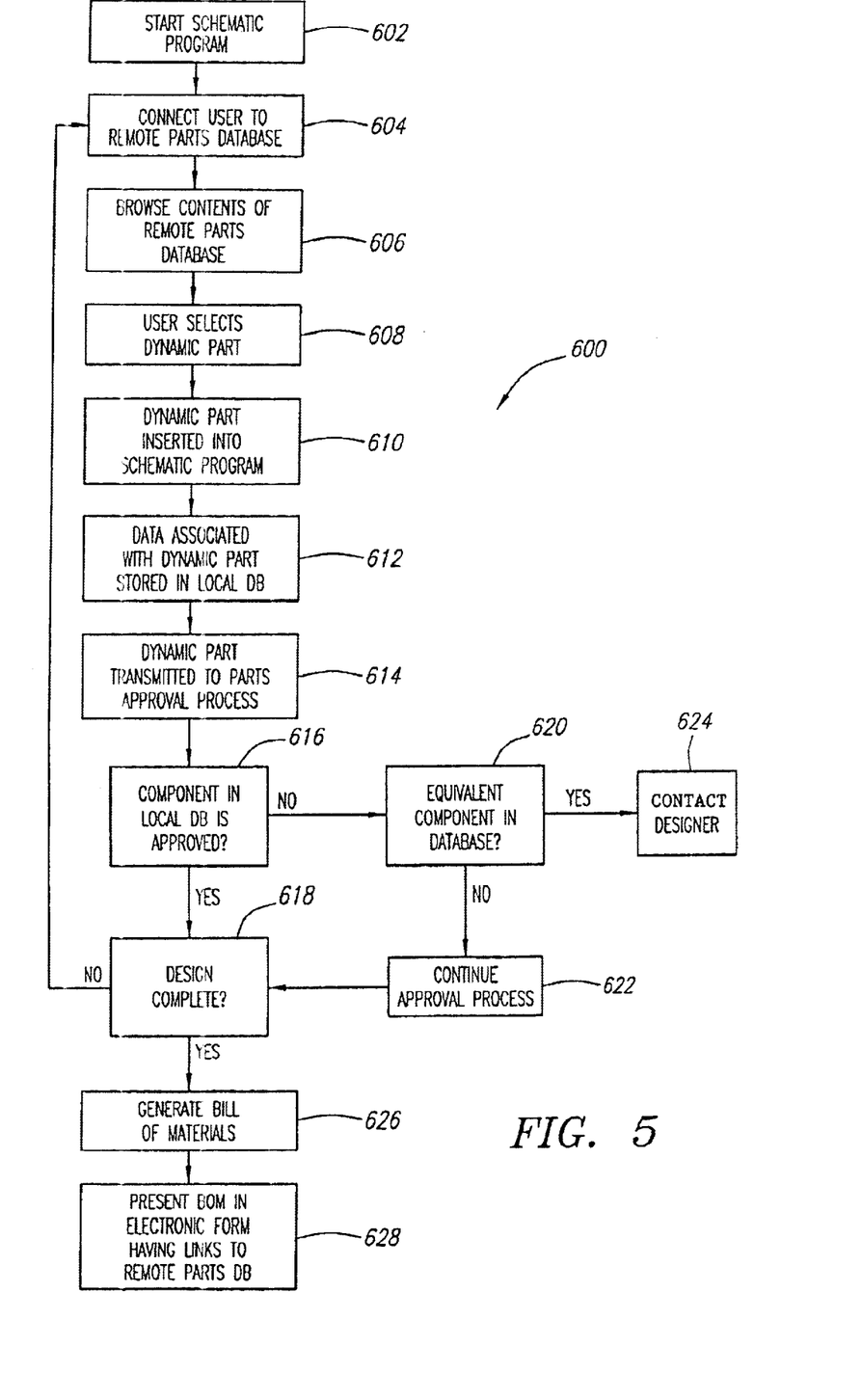
FIG. 5 is a flow chart showing the design and utilization flow over of the system in FIG. 4.

Turning now to FIG. 5, a process flow 600 for selecting and procuring electronic components is shown, which may be implemented in connection with the component selection and procurement system 400 shown in FIG. 4. In a preferred embodiment, the component selection and procurement process 600 begins with invoking a schematic program 404 in step 602. By way of example and not limitation, the schematic program 404 may comprise the Capture™ software package commercially available from OrCad, Inc. of Portland, Oreg. The schematic program 404 may also comprise a software program that allows construction or capture of schematics as part of a larger package of tools, or any other software program that allows for schematic design or analysis. The schematic program 404, as noted previously, runs on a user workstation 403, which is typically located at the facilities of a circuit design or engineering company.

In a next step 604 of the component selection and procurement process 600, the user workstation 403 is connected to the remote parts database 402. The connection from the user workstation 403 and the remote parts database 402 is preferably accomplished via a wide area distributed network (e.g., the Internet 450). The Internet 450, in particular, provides a relatively inexpensive and convenient means for connecting the schematic program 404 to the remote parts database 402. If connected to a local area network 425, the user workstation 403 may establish a connection to the remote parts database 402 over the Internet 450 via the router 426 connected to the local area network 425. Mechanisms for implementing connections across the Internet 450 are well-known to those skilled in the art. Alternatively, a dedicated line or other direct connection could be utilized to connect the user workstation 403 to the remote parts database 402.

In a next step 606, a set of dynamic parts are displayed at the user workstation 403 for the user to peruse. In one embodiment, the dynamic parts 460 are displayed on the screen of the user workstation 403 in a graphical or symbolic form, and are organized or grouped according to type (e.g., resistor, capacitor, etc.) and value. For example, all capacitors in a certain range of capacitance may be grouped together in a single category. Information pertaining to the dynamic parts 460 may be presented in a hierarchical menu format, with a list of top-level categories (e.g., component type), for example, at the highest menu level, and component values at a second menu level. Rather than using symbolic or graphical representations for components, in an alternative embodiment a textural list of dynamic parts 460 may be displayed on the screen of the user workstation 403, and the user may scroll through the list using, for example, arrow keys on the keyboard of the user workstation 403, or a computer mouse, a touchscreen or any other type of mechanism for navigating through screen options.

When a user views a dynamic part 460 displayed at the user workstation 403, the data items associated with that dynamic part 460 are preferably displayed along with the graphic or textural representation thereof. In one embodiment, for example, dynamic parts 460 are temporarily highlighted as the user scrolls through them, and the data items for the current highlighted dynamic part 460 are displayed next to the dynamic part 460 or in a special screen area. Alternately, the data items associated with the dynamic part 460 may be available on other screens available to the user by clicking on a specific location on the screen of the user workstation 403 or performing a similar such action. Many different ways for displaying the data items associated with a dynamic part 460 are possible and will be apparent to those skilled in the art. The nature of the graphical interface allowing the user to peruse the dynamic parts 460 is not critical, so long as the user is able to somehow view the dynamic parts 460 available and, preferably, the data items associated therewith.

In a preferred embodiment, the user can also conduct a search of the remote parts database 402 to find an electronic component having certain desired properties—for example, a resistor having a specific resistance value. Standard database search tools may be utilized for this purpose. The user may, for example, interactively enter the component type, the desired value (or range of values), and any other distinguishing information or characteristics at the user workstation 403, and commence a search of the remote parts database 402. The search results are returned to the user workstation 403 and displayed, allowing the user to peruse the search results in the same manner as the initially displayed dynamic parts listing.

Whether or not the user conducts a search, the user may browse through the displayed dynamic parts 460 to determine whether any of them would be beneficial to the user's circuit design. Profile information regarding the designer and/or the particular schematic design, among other items, may be stored in a user profile at the remote parts database 402 and used to assist in selection of appropriate electronic components. Likewise, metrics data regarding other designers having similar designs may be stored in a metrics server and used to assist in selection of appropriate electronic components. Use of such profiling and metrics routines is disclosed in greater detail in commonly-assigned and co-pending U.S. patent application Ser. No. 09/514,757 filed concurrently herewith, hereby incorporated by reference as if set forth fully herein.

A wide variety of data for the dynamic parts 460 may be made available to users perusing the remote parts database 402. In addition to component value, for example, footprint data for the dynamic part 460 is also preferably stored and associated therewith. Footprint data generally indicates the size and shape, and hence the area of the printed circuit board, that a given component will take up when placed in a design. By way of further example, additional information relating to dynamic parts 460 may include data sheets (or links to a supplier or distributor database 482 where such data sheets are found), application notes (which instruct an engineer about useful applications and design configurations utilizing the component), simulation models, timing models (such as TDML models), and models for simulating signal integrity (such as IBIS models). In one embodiment, the user is presented with menu options for selecting the type of data the user desires to view for a particular dynamic part 460, and selects the appropriate menu option. The remote parts database 402 then transmits the requested information in response to the user's request, for display at the user workstation 403. The remote parts database 402 may transmit information to the user workstation 403 in hyper text markup language (HTML) or any other suitable format.

In a next step 608, when the user finds a dynamic part 460 suitable for placement into the schematic program 404, the user selects that dynamic part 460 by any of a variety of ways that are known to one skilled in the art of computing. Again, the precise nature of the graphical interface is not critical, so long as the user is somehow able to select a dynamic part 460. In one embodiment, for example, wherein dynamic parts 460 are displayed to a user in a graphical form, the user selects a particular dynamic part 460 by clicking on its symbol or textual entry using a computer mouse. Alternatively, the user may press a key (e.g., the return key) on the keyboard of the user workstation 403 to select a highlighted entry from the list or display of dynamic parts 460.

Figure 6:
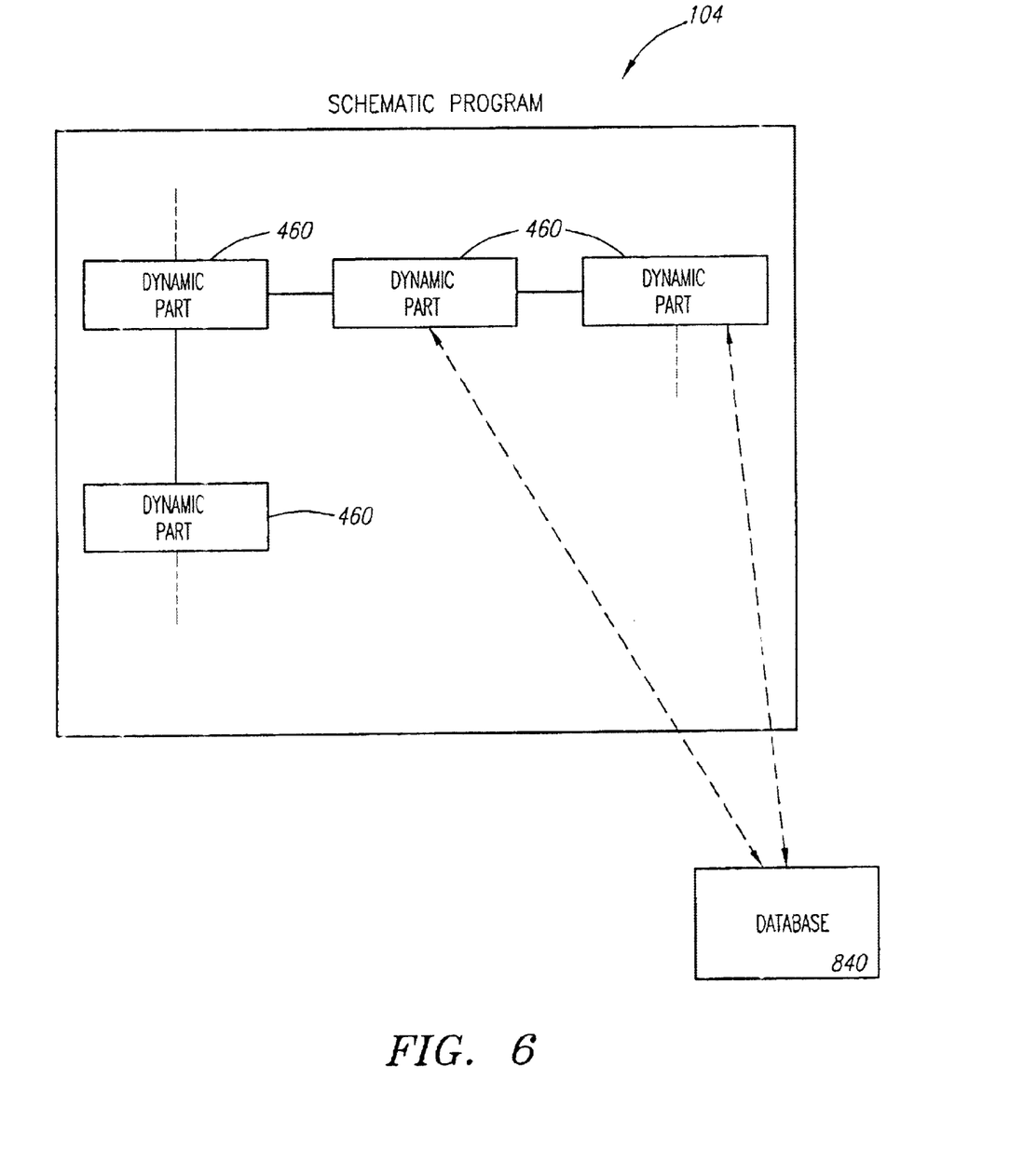
FIG. 6 is a schematic representation of the dynamic parts within a schematic program, and of their links to a separate database.

In a next step 610, the user inserts the selected dynamic part 460 into a design within the schematic program 404. In a preferred embodiment, the user clicks on the desired dynamic part 460 with a computer mouse and places the part into the design within the schematic program 404. This placing action has the effect of transmitting a copy of the dynamic part 460 over the Internet 450 into the design within the schematic program 404. Mechanisms for moving an item that appears on a computer screen and copying over data associated with the items (e.g., dragging and dropping) are well known to those skilled in the art. After the dynamic part 460 has been placed into the design within the schematic program 404, the dynamic part 460 may then be manipulated within the schematic program 404 in the same manner as any other graphical icon or symbol used within the schematic program 404. Once placed in the design, the selected dynamic part 460 preferably has the functionality within the schematic program 404 according to the type and value of part, similar to other types of standard graphical components or symbols used in such schematic program 404 in the prior art. Referring to FIG. 6, a design within the schematic program 404 is shown having a number of dynamic parts 460 inserted therein. The dynamic parts 460 may be interconnected within the schematic program in the same fashion that prior art symbols are utilized in similar schematic programs. While, in some embodiments, dynamic parts 460 may be intermixed with standard "non-dynamic" parts within a design, it is advantageous in some applications to have all of the components within a design be dynamic parts 460.

It may be useful in some embodiments for the user to have access to a summary list of which parts within the design are dynamic. A dynamic parts manager (not shown) may thus be provided at the user workstation 403 whereby the user can obtain a list or other indication of which parts within a design are dynamic. Using the dynamic parts manager, the user may also be provided with the ability to "link" a non-dynamic part to a dynamic part 460 in the remote parts database 402. The act of linking a non-dynamic part to a dynamic part 460 causes the non-dynamic part to take on the attributes of the dynamic part 460 to which it is linked. The non-dynamic part thereby effectively becomes a dynamic part. In such a manner, non-dynamic parts that have already been placed can essentially be converted into dynamic parts.

With reference once again to FIG. 5, the act of selecting a dynamic part 460 for copying into the schematic program 404 triggers the next step 612, wherein component data associated with the dynamic part 460 is transmitted (i.e., downloaded) from the user workstation 403 to a local database 415 or 430, which are illustrated in FIG. 4. The local database 430 may, for example, be connected within a local area network 425 interconnecting a plurality of user workstations 403. Alternatively, the local database 415 or 430 may be connected to the user workstation 430 over a wide area network, a dedicated connection, or by any other mechanism which may effectively be utilized to connect a user workstation 403 to a database. The local database 415 or 430 preferably comprises an engineering database 412 for storing circuit designs and a resource planning database 410. Examples of the latter include an enterprise resource planning (ERP) database, or a material resource planning (MRP) database. Component data associated with the dynamic part 460 that is copied to the user workstation 403 is preferably imported into the engineering database 412 and stored therein. The stored component data preferably includes a link to the remote parts database 402. Such a link is preferably in the form of a uniform resource locator (URL) address, which allows connection to the remote parts database 402 over the Internet 450 and retrieval of the specific information associated with the selected dynamic part 460 at a later time.

In a preferred embodiment, the resource planning database 410 and the engineering database 412 store component data items for each dynamic part 460 downloaded by a user. Preferably, the stored component data items includes the link (e.g., URL) between the dynamic part 460 and the remote parts database 402. Additional component data items selected for storage may include links (e.g., URLs) between each dynamic part 460 and the appropriate supplier or manufacturer database 482 of the supplier or manufacturer of the dynamic part 460. By storing these links locally in conjunction with the dynamic parts 460, information regarding each dynamic part 460 is made accessible to management, procurement and other departmental units within an organization, without the need for separately invoking the schematic program 404. Users connected to the local database 415 or 430 may instead access dynamic part information using a standard web browser or similar program, linking to the supplier's or manufacturer's website (i.e., database 482) over the Internet 450 using the stored links (e.g., URLs).

In an alternative embodiment, when a dynamic part 460 is selected by the user from the remote parts database 402, information relating to the dynamic part 460 is copied from the remote parts database 402 to both the user workstation 403 and the engineering design database 412. In such an embodiment, the user workstation 403 need not itself transmit any dynamic part data to the engineering design database 412. In another alternative embodiment, information relating to the dynamic part 460 is downloaded from the remote parts database 402 to the user workstation 403 and to the engineering design database 412 over separate connections.

As further illustrated in FIG. 6, a link between a dynamic part 460 in the schematic program 404 and a remote database 840 is depicted. The remote database 840 may be either the remote parts database 402, a supplier or distributor database 482, or another database separate from the schematic program 404. The dynamic part 460 allows retrieval of information from the remote database 840 by the user at the user workstation 403, which is generally accomplished through a connection over the Internet 450. By the user selecting the dynamic part 460 within the design of the schematic program 404, for example, the user workstation 403 may establish a connection over the Internet 450 to the remote parts database 402 or the supplier or distributor database 482, and retrieve additional information relating to the dynamic part 460 (e.g., data sheets, application notes, timing models, or other such information). To establish the connection to the remote database 840, the user workstation 403 retrieves the appropriate link (e.g., URL) either from the design within the schematic program 404 or else the local database 415 or 430. In one aspect, the dynamic part 460 acts as a remote database client, with the remote database 304 acting as a remote server.

In a preferred embodiment, further steps are carried out to enter selected dynamic parts in a parts approval process and/or procurement process. Accordingly, in a next step 614 of the design and procurement process 600 illustrated in FIG. 5, when a dynamic part 460 is placed in the local database 415 or 430, the dynamic part 460 enters a parts approval process, so as to qualify it for use by the designer's organization. Preferably, the parts approval process is handled through the resource planning database 410. However, the parts approval process may be carried out in any of a variety of different manners depending on the nature of the user's organization, and may comprise, for example, an automated process, a semi-automated process, or a manual process. By automatically placing a dynamic part 460 into the parts approval process as soon as the dynamic part 460 is selected for use in the schematic program 404, the parts approval process begins as promptly as possible, reducing delays in the design development process. Further, problems associated with a designer's failure to identify, for approval purposes, all of the electronic components used in the design are minimized, because all dynamic parts 460 are automatically entered into the parts approval process upon placement in the schematic program 404.

In a next step 616, after the dynamic part is placed in the parts approval process, the process checks for the existence of the dynamic part 460 within the resource planning database 410. If the dynamic part 460 is already approved for use in design and manufacturing, then the parts approval process is complete, and the process moves to step 618. If, on the other hand, the dynamic part 460 is not already approved (i.e., is not present within the resource planning database 410), then, in one embodiment, in a next step 620, the resource planning database 410 is searched for the presence of an equivalent part. If an equivalent part is found in the resource planning database 410, then the process moves to step 624 in which the designer is notified that the original dynamic part 460 is not approved, but that an equivalent pre-approved part exists. The designer may then be encouraged, or required, to use the equivalent pre-approved part. If there is no equivalent part in the resource planning database 410 in step 620, then the process moves to step 622, wherein the parts approval process continues. From this point forward, the parts approval process may include many other steps which will vary from company to company, and which may include such items as quality certification, site visits to verify manufacturing standards and ability to produce an adequate volume of parts, and so forth.

If the design is not yet complete, then, returning to step 604, the designer selects additional parts as necessary from the remote parts database 402 in order to complete the design. The component selection process may be carried out in one continuous session by the designer, or else may be spread out over a number of different sessions at different times.

When the design is complete, the process moves to step 626, which involves the generation of a bill of materials for the design. In a preferred embodiment, the bill of materials is generated by the schematic program 404, which tallies up the number and type of parts utilized in a design generated within the schematic program 404, and generates a list of those parts and their quantities. In a next step 628, the bill of materials is presented in an electronic form that includes, from information stored by the schematic program 404 or the local database 415 or 430, links (e.g., URLs) to the suppliers and/or distributors of these electronic components. In a preferred embodiment, the bill of materials also includes information regarding the approval status of these parts and the current lead time and cost for each of the parts. The lead time and cost may be obtained directly from the supplier or distributor database 482 during the generation of the bill of materials, by automatically connecting to the supplier or distributor database 482 using the stored links for the dynamic parts 460. The electronic bill of materials may also include links to other remote databases containing information about the dynamic parts 460.

After the design has been finalized and the bill of materials has been generated, the parts may then be procured from the appropriate suppliers. An example of a process for procuring electronic components is disclosed in common-assigned U.S. application Ser. No. 09/514,757 filed concurrently herewith, previously incorporated by reference as if set forth fully herein. The procurement process may involve, for example, the automatic generation of purchase orders for the desired parts in the bill of materials (based on the expected quantity of production), which may be transmitted in electronic form over the Internet 450 to the appropriate supplier or distributor using the stored links to the supplier or distributor.

The concepts described hereinabove with respect to selecting, placing and procuring dynamic parts within a printed circuit board (PCB) design apply equally to selecting, placing and procuring components for an integrated chip design. In one embodiment, for example, one or more of the dynamic parts 460 may comprise virtual circuit blocks, which may be selected and placed within an integrated chip design. Likewise, discrete components such as transistors, resistors, capacitors and operational amplifiers, as well as logic gates, arithmetic logic units, analog-to-digital converters, digital-to-analog converters, random-access memory, static memory, register banks, microcontrollers, microprocessors and other components may be selected from a database of dynamic parts (analogous to remote parts database 402 in FIG. 4) and placed within an integrated circuit design. Such dynamic parts may be procured in a manner similar to the dynamic parts used in printed circuit board designs, described previously herein.

In various embodiments disclosed herein, systems and methods have been provided for simplifying the process of obtaining information about electronic components, managing that information, and purchasing electronic components. A preferred method for selecting and utilizing dynamic representations of electronic components, and many of its attendant advantages, has thus been disclosed. It will be apparent, however, that various changes may be made in the form, content and arrangement of the steps without departing from the spirit and scope of the invention, the methods and systems hereinbefore described being merely preferred or exemplary embodiments thereof. Therefore, the invention is not to be restricted or limited except in accordance with the following claims and their legal equivalents.

What is claimed is:

1. A method for selecting electronic components from a remote database over a distributed electronic network, the method comprising:
   storing a plurality of dynamic parts in a remote parts database, wherein each of said plurality of dynamic parts represents an individual electronic component and comprises a plurality of component data items and modeling behavior characteristics;
   connecting a user computer to said remote parts database; and
   embedding a dynamic part from said remote parts database into an application running on the user's computer.

2. The method of claim 1, wherein said application running on the user's computer comprises a software program for modeling an electronic design.

3. The method of claim 2, wherein said dynamic part functions within said application as a component of a modeled electronic design.

4. The method of claim 1, further comprising:
   displaying said dynamic parts graphically on the user's computer; and
   receiving a selection indication of a dynamic part from a user.

5. The method of claim 4, wherein said selection indication is performed by the user dragging a graphical icon representing the selected dynamic part into said application.

6. The method of claim 1, further comprising copying said component data items into a local database connected to the user computer upon embedding said dynamic part into the application.

7. The method of claim 6, wherein said local database comprises a resource planning database, said method further comprising:
   entering a component represented by said dynamic part into a parts approval process; and
   comparing the component with data records of components already stored in said resource planning database.

8. The method of claim 6, further comprising updating said local database from said remote parts database by moving data from said remote parts database to said local database without user intervention.

9. The method of claim 6, further comprising updating said local database from said remote parts database by moving data from said remote parts database to said local database in response to a user request for said data.

10. The method of claim 1, wherein said embedded dynamic part comprises a link to associated data stored in said remote parts database.

11. The method of claim 1, wherein said embedded dynamic part comprises a link to associated data stored in a database of a supplier or distributor of the electronic component represented by said dynamic part.

12. The method of claim 1, further comprising:
   embedding a set of said dynamic parts into said application running on the user's computer; and
   generating an electronic bill of materials based on said dynamic parts in said application, said electronic bill of materials comprising a link to either said remote parts database or another remote database for each dynamic part.

13. A system for providing electronic components to users over a distributed electronic network, comprising:

a remote parts database;

a plurality of dynamic parts stored in said remote parts database, wherein each of said plurality of dynamic parts represents an individual electronic component and comprises a plurality of component data items and modeling behavior characteristics; and a server connected to said remote parts database and to said distributed electronic network, for connecting a user computer to said remote parts database and for transmitting dynamic parts to an application running on the user computer.

14. The system of claim 13, wherein said application running on the user computer comprises a software program for modeling an electronic design.

15. The system of claim 14, wherein said dynamic parts function within said application as components of a modeled electronic design.

16. The system of claim 13, wherein said server transmits a list of dynamic parts to the user computer for graphical display, and receives a selection indication of a dynamic part from the user computer.

17. The system of claim 13, further comprising a local database connected to the user computer, said local database storing dynamic parts transmitted to the user computer.

18. The system of claim 17, wherein said local database comprises a resource planning database containing data records of approved parts, said system further comprising a parts approval process for comparing each dynamic part transmitted to the user computer with said data records of approved parts.

19. The system of claim 13, wherein one or more of said dynamic parts transmitted to the user computer comprises a link to either said remote parts database or another remote database.

20. The system of claim 13, further comprising a process for generating an electronic bill of material based on said dynamic parts transmitted to said application on the user computer, said electronic bill of material comprising a link for each dynamic part to either said remote parts database or another remote database.

21. A computer program product that includes a computer-usable medium having a sequence of instructions which, when executed by a processor, causes said processor to execute a process for selecting electronic components from a remote database over a distributed electronic network, the process comprising:

storing a plurality of dynamic parts in a remote parts database, wherein each of said plurality of dynamic parts represents an individual electronic component and comprises a plurality of component data items and modeling behavior characteristics;

connecting a user computer to said remote parts database; and embedding a dynamic part from said remote parts database into an application running on the user's computer.

22. The computer program product of claim 21, wherein said application running on the user's computer comprises a software program for modeling an electronic design.

23. The computer program product of claim 22, wherein said dynamic part functions within said application as a component of a modeled electronic design.

24. The computer program product of claim 22, wherein the process further comprises:

displaying said dynamic parts graphically on the user's computer; and receiving a selection indication of a dynamic part from a user.

25. The computer program product of claim 22, wherein the process further comprises copying said component data items into a local database connected to the user computer upon embedding said dynamic part into the application.

26. The computer program product of claim 22, wherein said embedded dynamic part comprises a link to associated data stored in said remote parts database.

27. The computer program product of claim 22, wherein said embedded dynamic part comprises a link to associated data stored in a database of a supplier or distributor of the electronic component represented by said dynamic part.

* * * * *